(No Model.)
J. A. ROSSMAN.
PLUG FOR SOIL OR OTHER PIPES.
No. 424,690. Patented Apr. 1, 1890.
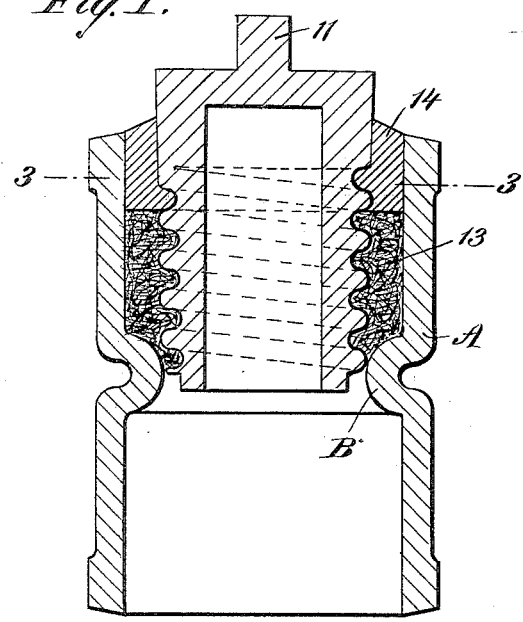
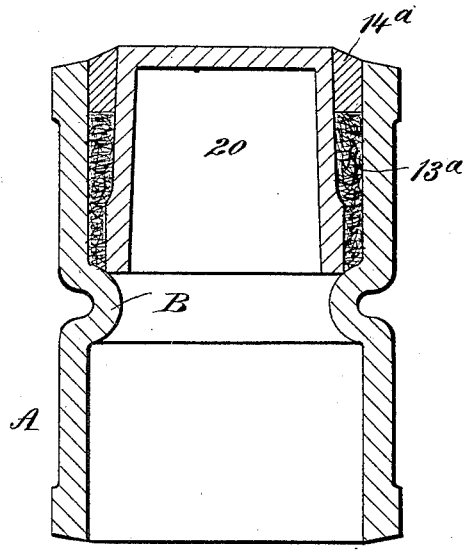
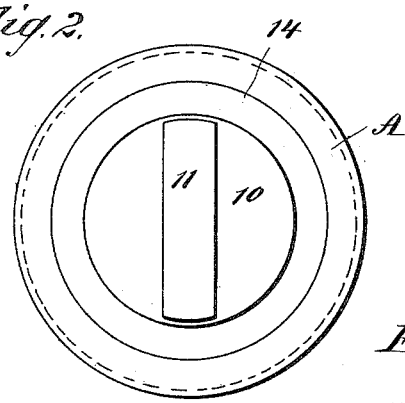
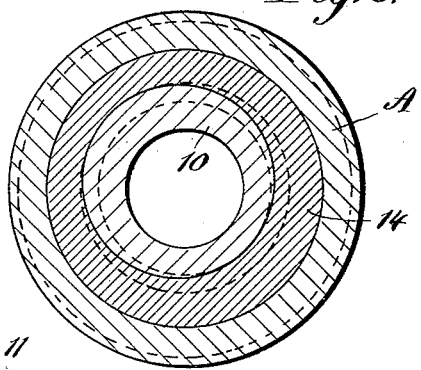
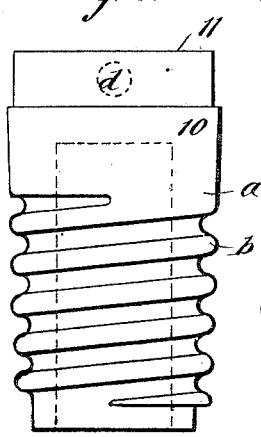
WITNESSES:
Donn Twitchell
C. Sedgwick
INVENTOR:
J. A. Rossman
BY Munn & Co.
ATTORNEYS.

UNITED STATES PATENT OFFICE.

JONAS A. ROSSMAN, OF NEW YORK, N. Y.

PLUG FOR SOIL OR OTHER PIPES.

SPECIFICATION forming part of Letters Patent No. 424,690, dated April 1, 1890.

Application filed December 20, 1889. Serial No. 334,382. (No model.)

*To all whom it may concern:*

Be it known that I, JONAS A. ROSSMAN, of New York city, in the county and State of New York, have invented a new and Improved Plug for Soil or other Pipes, of which the following is a full, clear, and exact description.

In laying or setting up soil, gas, or other pipes it frequently becomes necessary to provide for the introduction of branch pipes and to provide for the testing of the pipes as they are laid. To this end the pipes are usually laid with a number of branch couplings having normally-open ends, which have to be plugged to prevent the escape of solid, liquid, or gaseous matters from the pipes, either at times when the pipes are in use or when they are being tested.

Prior to my invention it has been a matter of great difficulty to provide a plug which would properly close or stop the open end of the pipe or coupling, and which at the same time could be readily removed, the best plan heretofore devised being to place a cap within the open end of the coupling or pipe, such cap being formed with an expanded open end. After the cap had been placed in position the space between its peripheral face and the inner peripheral face of the pipe or coupling was packed with oakum, lead being finally poured in and hammered down to form a tight joint. This method of closing the end of the pipe is very effective in so far as the seal is concerned, but it is extremely difficult to remove the cap, it being necessary to chip the lead out bit by bit by means of a chisel and hammer, which is a slow and laborious process and frequently results in breaking the pipe or coupling-piece, and it also frequently happened that the cap would be broken. It is to overcome this objection to the old way of closing the openings of the pipes or couplings that I have designed the plug forming the subject-matter of this application, the invention consisting, essentially, of a circular center or body upon which there is formed a spiral thread and a packing of oakum or other proper material and lead, the circular center being arranged for engagement with a wrench or lever, all as will be hereinafter more fully explained, and specifically pointed out in the claims.

Reference is to be had to the accompanying drawings, forming a part of this specification, in which similar figures and letters of reference indicate corresponding parts in all the views.

Figure 1 is a central sectional view of a pipe-coupling, representing the same as it appears when stopped at one end with my improved plug. Fig. 2 is a plan view of the coupling and plug. Fig. 3 is a cross-sectional view on line 3 3 of Fig. 1. Fig. 4 is a side view of the center or plug-body. Fig. 5 is a central sectional view of a coupling, representing the same as it appears when closed by means of the ordinary cap, as hereinbefore set forth.

In the drawings, 10 represents a circular center or body, of which the peripheral face $a$ is preferably in the form of the frustum of a cone. This center 10 is generally made hollow, as shown, and formed with a screw-thread $b$, that is rounded in cross-section, as clearly represented in Figs. 1 and 4. In practice I prefer that the thread $b$ should not extend beyond the general peripheral face of the center 10. In order that the center 10 may be engaged by a wrench or lever, I form it with a projection 11, such projection being arranged to fit within a wrench-socket, and, if desired, this projection could be apertured to receive the end of a lever, such aperture being shown at $d$.

In the drawings forming part of this specification I have represented the center 10 as it would appear when applied to a soil-pipe coupling A, such coupling being formed with inwardly-extending flanges B.

In applying the center above described, and illustrated in Fig. 4, such center is placed within the open end of the coupling A, being centered therein, as represented, by the flange B, and oakum or other packing 13 is placed in position about the center and thoroughly tamped, the packing 13 being carried upward to about the relative position in which it is shown in Fig. 1. After the oakum has been tamped to place lead 14 is run in between the center and the inner peripheral face of the coupling, and after this lead has set it is hammered down to insure the formation of a close joint. The oakum or other packing 13 should terminate at a point such that the lead will enter the groove between the thread-sections and follow such groove at least for one turn around the center.

To remove the center 10, a wrench is brought into engagement with its projection 11 and turned in a direction proper to carry the center outward, but little power being required after the body has once been started, owing to its tapering formation. The center might be started by tapping it lightly with a hammer. When the center is removed, the lead and oakum may be easily taken out, as will be readily understood, and all danger of breaking the pipe or coupling may be avoided.

By forming the thread $b$ so that it is rounded in cross-section I find that the oakum will enter the groove between the thread-sections. In the drawings I have illustrated a single thread; but it will of course be understood that two or more threads could be formed on the center.

In Fig. 5, which is given to illustrate the old way of stopping the open end of a coupling or pipe-section, as hereinbefore set forth, 20 represents the cap, $13^a$ the oakum packing, and $14^a$ the lead packing.

Having thus fully described my invention, I claim as new and desire to secure by Letters Patent—

A soil-pipe plug consisting of the central metallic body 10, provided with exterior screw-threads, an inner soft packing arranged between the inner end of the central body and the wall of the pipe, and an outer hard packing arranged upon the soft packing, as herein shown and described.

JONAS A. ROSSMAN.

Witnesses:
C. SEDGWICK,
EDWD. M. CLARK.